(12) United States Patent
Falcone et al.

(10) Patent No.: US 12,454,183 B2
(45) Date of Patent: Oct. 28, 2025

(54) VEHICLE HAVING A DRIVE AXLE SYSTEM AND METHOD OF CONTROL

(71) Applicant: ArvinMeritor Technology, LLC, Troy, MI (US)

(72) Inventors: Frank J. Falcone, Escondido, CA (US); Aakash Ahuja, Escondido, CA (US); Ameya S. Jathar, Escondido, CA (US); Eddie J. Toral, Escondido, CA (US)

(73) Assignee: ArvinMeritor Technology, LLC, Troy, MI (US)

( * ) Notice: Subject to any disclaimer, the term of this patent is extended or adjusted under 35 U.S.C. 154(b) by 243 days.

(21) Appl. No.: 17/892,741

(22) Filed: Aug. 22, 2022

(65) Prior Publication Data
US 2024/0059154 A1    Feb. 22, 2024

(51) Int. Cl.
*B60L 7/26*      (2006.01)
*B60L 15/20*     (2006.01)
*B60K 1/00*      (2006.01)

(52) U.S. Cl.
CPC ............ *B60L 7/26* (2013.01); *B60L 15/2009* (2013.01); *B60K 2001/001* (2013.01); *B60L 2240/423* (2013.01); *B60L 2250/26* (2013.01)

(58) Field of Classification Search
None
See application file for complete search history.

(56) References Cited

U.S. PATENT DOCUMENTS

| | | |
|---|---|---|
| 10,377,243 B2 | 8/2019 | Badger et al. |
| 10,989,288 B1 | 4/2021 | Ghatti et al. |
| 11,002,352 B2 | 5/2021 | Ghatti et al. |
| 11,038,396 B2 | 6/2021 | Raya et al. |
| 11,207,976 B2 | 12/2021 | Ghatti et al. |
| 11,209,072 B2 | 12/2021 | Ghatti et al. |
| 11,220,176 B1 * | 1/2022 | Cradit .................... F16H 3/093 |
| 2018/0015830 A1 * | 1/2018 | Brouwer ................ B60T 8/321 |
| 2021/0291646 A1 | 9/2021 | Lorenz et al. |

FOREIGN PATENT DOCUMENTS

CN    114523853 A    5/2022

OTHER PUBLICATIONS

Extended European Search Report dated Dec. 1, 2023 for related European Appln. No. 23192175.0 11 Pages.
Heekwang Lee et al., "Zero Torque Control for EV Coasting Considering Cross-Coupling Inductance"; IEEE Transactions on Industrial Electronics (vol. 64, Issue: 8, Aug. 2017).

* cited by examiner

*Primary Examiner* — Hongye Liang
(74) *Attorney, Agent, or Firm* — Brooks Kushman PC

(57) ABSTRACT

A vehicle having a drive axle system and a method of control. Electrical energy is provided from an electric power source to an electric motor to offset regenerative power generated by the electric motor when the vehicle is in motion and braking and acceleration of the vehicle are not requested.

20 Claims, 2 Drawing Sheets

VEHICLE HAVING A DRIVE AXLE SYSTEM AND METHOD OF CONTROL

TECHNICAL FIELD

This relates to a vehicle having a drive axle system and a method of control.

BACKGROUND

An electrified vehicle and a method of dissipating energy within the electrified vehicle is disclosed in U.S. Pat. No. 10,377,243.

SUMMARY

In at least one embodiment a method of controlling a vehicle having a drive axle system is provided. The method includes providing electrical energy from an electric power source to an electric motor to offset regenerative power that is generated by the electric motor when the vehicle is in motion and braking and acceleration of the vehicle are not requested.

Electrical energy may be provided from the electric power source to the electric motor to offset regenerative power when the electric power source cannot absorb the regenerative power generated by the electric motor.

Electrical energy may not be provided from the electric power source to the electric motor to offset regenerative power when the vehicle is not in motion. Electrical energy may not be provided from the electric power source to the electric motor to offset regenerative power when braking of the vehicle is requested. Electrical energy may not be provided from the electric power source to the electric motor to offset regenerative power when acceleration of the vehicle is requested. Electrical energy may not be provided from the electric power source to the electric motor to offset regenerative power when regenerative power is not generated by the electric motor. Electrical energy may not be provided from the electric power source to the electric motor to offset regenerative power when the electric power source can absorb the regenerative power generated by the electric motor.

Providing electrical energy from the electric power source to the electric motor may provide propulsion torque that counteracts the regenerative power.

Offsetting regenerative power generated by the electric motor may include fully offsetting the regenerative power or partially offsetting the regenerative power.

The method may include determining whether the regenerative power is less than a predetermined amount after providing electrical energy from the electric power source to the electric motor to offset the regenerative power. Providing electrical energy from the electric power source to the electric motor to offset regenerative power may be terminated when the regenerative power is less than the predetermined amount. Electrical energy may continue to be provided from the electric power source to the electric motor to offset regenerative power when the regenerative power is not less than the predetermined amount.

In at least one embodiment a vehicle is provided. The vehicle has a drive axle system. The drive axle system includes an electric power source, an electric motor, and axle assembly, and a controller. The electric motor is electrically connected to the electric power source. The axle assembly is operatively connected to the electric motor. The axle assembly has an axle shaft that is connected to a wheel assembly. The controller is configured to provide electrical energy from the electric power source to the electric motor to offset regenerative power that is generated by the electric motor. The regenerative power is generated when the vehicle is in motion and braking and acceleration of the vehicle are not requested.

A speed sensor may provide a signal indicative of motion of the vehicle. The signal may be indicative of rotation of the wheel assembly.

An accelerator pedal may provide a signal indicative of a request for acceleration of the vehicle. A brake pedal may provide a signal indicative of a request for deceleration of the vehicle.

The controller may not provide electrical energy from the electric power source to the electric motor to offset regenerative power that is generated by the electric motor when there is no regenerative power generated by the electric motor. The controller may not provide electrical energy from the electric power source to the electric motor to offset regenerative power that is generated by the electric motor when the electric power source can absorb the regenerative power.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
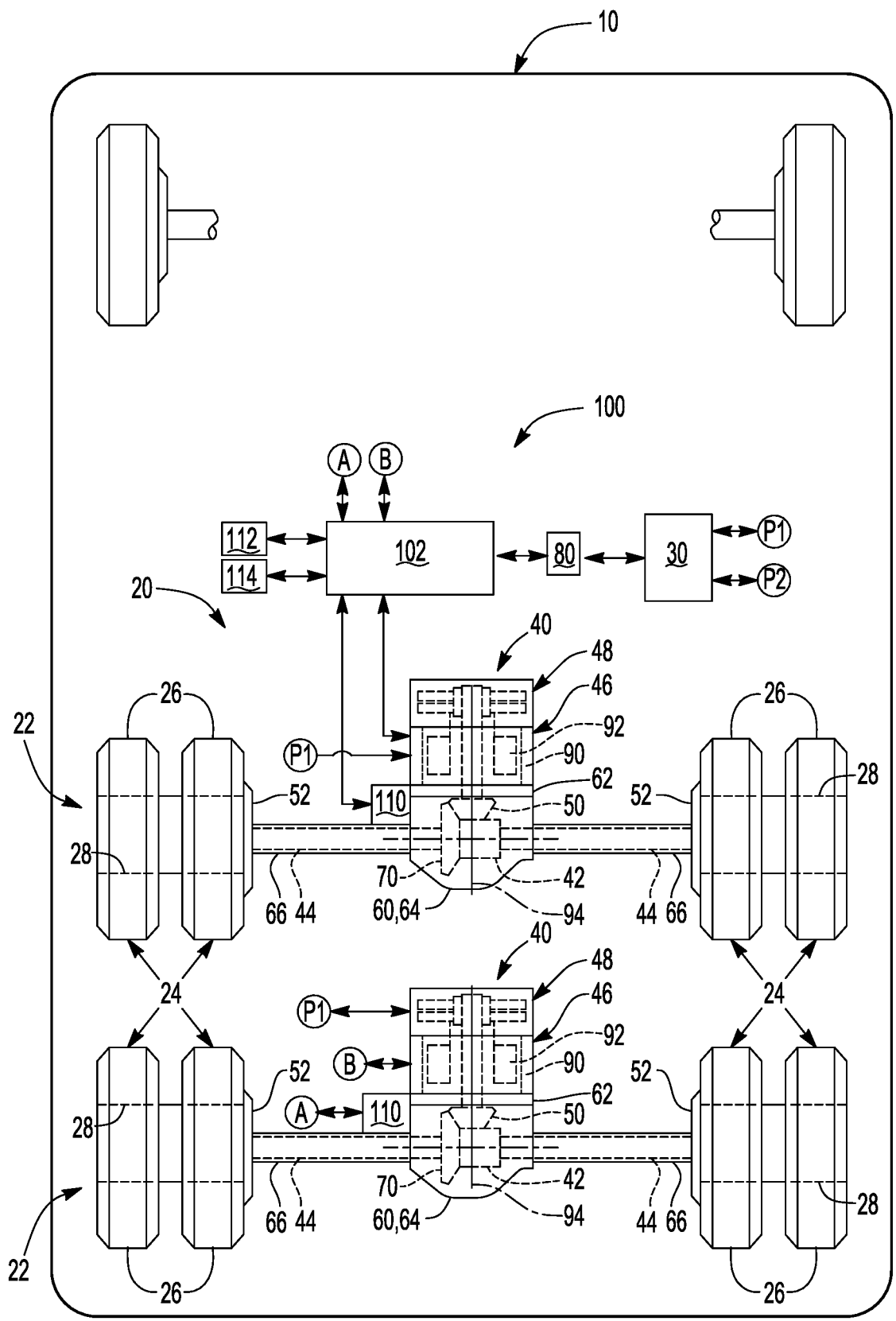
FIG. 1 is a schematic representation of an example of a vehicle having a drive axle system that includes an electric motor.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments. The vehicle 10 may include a drive axle system 20.

The drive axle system 20 includes one or more axle assemblies 22, such as a front axle assembly and a rear axle assembly. The axle assemblies 22 are illustrated as drive axle assemblies. A drive axle assembly may be configured to provide torque to one or more wheel assemblies 24 that may be rotatably supported on the axle assembly 22. A wheel assembly 24 may include a tire 26 disposed on a wheel 28. The drive axle system 20 may also include or be associated with at least one electric power source 30, such as an electrical energy storage device like a battery.

In at least one configuration, the front axle assembly 22 and the rear axle assembly 22 may generally be disposed near each other and may be positioned toward the rear of the vehicle 10, similar to a conventional tandem axle arrangement. However, unlike a conventional tandem axle arrangement, the front axle assembly 22 and the rear axle assembly 22 are not operatively connected to each other and do not receive torque from the same electric motor. As such, the front axle assembly 22 and the rear axle assembly 22 are not connected in series with each other with a shaft, such as a prop shaft that may connect an output of the front axle assembly 22 with an input of the rear axle assembly 22. It is also contemplated that the front axle assembly 22 and the rear axle assembly 22 may be arranged in a different manner, such as with either or both axle assemblies being disposed near the front of the vehicle.

The front axle assembly and the rear axle assembly may have similar or identical configurations. In the configuration shown, both axle assemblies include a housing assembly 40, a differential assembly 42, a pair of axle shafts 44, an electric motor 46, a transmission 48, and a drive pinion 50. In addition, a friction brake 52 may be associated with each wheel assembly 24. The positioning of the differential assembly 42, the electric motor 46, and/or the transmission 48 may differ from that shown. For instance, the differential assembly 42 may be positioned between the electric motor 46 and the transmission 48.

The housing assembly 40 receives various components of the axle assembly 22. In addition, the housing assembly 40 may facilitate mounting of the axle assembly 22 to the vehicle 10. In at least one configuration, the housing assembly 40 may include an axle housing 60 and a differential carrier 62.

The axle housing 60 may receive and support the axle shafts 44. In at least one configuration, the axle housing 60 may include a center portion 64 and at least one arm portion 66.

The center portion 64 may be disposed proximate the center of the axle housing 60. The center portion 64 may define a cavity that may receive the differential assembly 42.

One or more arm portions 66 may extend from the center portion 64. For example, two arm portions 66 may extend in opposite directions from the center portion 64 and away from the differential assembly 42. The arm portions 66 may each have a hollow configuration or tubular configuration that may extend around and may receive a corresponding axle shaft 44 and may help separate or isolate the axle shaft 44 from the surrounding environment. A wheel hub may be rotatably disposed on an arm portion 66 and operatively connected to an axle shaft 44. A wheel assembly 24 is mountable to the wheel hub.

The differential carrier 62 may be mounted to the center portion 64 of the axle housing 60. The differential assembly 42 may be rotatably supported on the differential carrier 62.

The differential assembly 42 is disposed in the housing assembly 40. For instance, the differential assembly 42 may be disposed in the center portion 64 of the axle housing 60. The differential assembly 42 may transmit torque to the axle shafts 44 of the axle assembly 22 and permit the axle shafts 44 and wheel assemblies 24 to rotate at different velocities in a manner known by those skilled in the art. For example, the differential assembly 42 may have a ring gear 70 that may be fixedly mounted on a differential case. The ring gear 70 and the differential case may be rotatable about a differential axis. The differential case may receive differential gears that may be operatively connected to the axle shafts 44.

The axle shafts 44 are configured to transmit torque between the differential assembly 42 and a corresponding wheel hub. For example, two axle shafts 44 may be provided such that each axle shaft 44 extends through a different arm portion 66 of axle housing 60. The axle shafts 44 may be rotatable about an axis, such as a wheel axis or the differential axis.

The electric motor 46 is configured to provide torque, such as propulsion torque or regenerative braking torque. Propulsion torque may be used to propel the vehicle 10, such as in a forward or backward direction. Propulsion torque may also be used to hold the vehicle in a stationary position or to help reduce, limit, or prevent vehicle rollback, such as when the vehicle 10 is on an inclined surface. Regenerative braking may provide a regenerative braking torque, which may also be referred to as regenerative brake torque or regenerative torque. Regenerative braking may capture kinetic energy when the electric motor 46 is used to brake or slow the velocity of the vehicle 10. Recovered energy may be transmitted from the wheel assemblies 24 to drive the electric motor 46. Thus, the electric motor 46 may function as a generator and may be used to charge the electric power source 30. The electric motor 46 may be electrically connected to the electric power source 30 via an inverter 80 in a manner known by those skilled in the art.

An example of electrical connections between the front axle assembly 22 and the rear axle assembly 22 and the electric power source 30 are represented with connection symbols P1 and P2, respectively. In the example shown, the electric power source 30 is electrically connected to both axle assemblies 22; however, it is contemplated that each axle assembly 22 may be electrically connected to a different electric power source 30. For instance, a first power source may be electrically connected to a first axle assembly but not to a second axle assembly while a second power source may be electrically connected to the second axle assembly but not to the first axle assembly.

The electric motor 46 may be mounted to or positioned inside of the housing assembly 40. The electric motor 46 includes a stator 90 and a rotor 92. The stator 90 may be fixedly positioned with respect to the housing assembly 40. The stator 90 may encircle the rotor 92. The rotor 92 is rotatable about an axis 94 with respect to the stator 90.

The transmission 48 facilitates the transmission of torque between the electric motor 46 and the drive pinion 50. Torque transmission may be bidirectional. The transmission 48 may provide gear reduction and multiple gear ratios between the rotor 92 and the drive pinion 50. The transmission 48 may be of any suitable type. For instance, the transmission 48 may be a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352 and 11,209,072. Examples of an axle assembly having a dual countershaft transmission is disclosed in U.S. Pat. Nos. 10,989,288, 11,207,976, and 11,220,176. Examples of an axle assembly having an epicyclic transmission are disclosed in U.S. Pat. No. 11,038,396 and U.S. patent application Ser. No. 17/308,307. The disclosures of the references in the preceding three sentences are hereby incorporated in their entirety by reference herein.

Referring to FIG. 1, the drive pinion 50 operatively connects the differential assembly 42 and the transmission 48. The drive pinion 50 may be received in the housing assembly 40 and may transmit torque between the differential assembly 42 and the transmission 48. The drive pinion 50 may be rotatable about an axis, such as the axis 94, and may have a gear portion that has teeth that meshes with teeth of the ring gear 70 of the differential assembly 42. Torque that is provided by the electric motor 46 to the transmission 48 and to the drive pinion 50 may be transmitted to the ring gear 70 and thus to the differential assembly 42.

The friction brake 52 is configured to provide a friction brake torque that inhibits rotation or that resists or slows rotation of a wheel assembly 24. A friction brake 52 may be mounted to each arm portion 66 proximate a wheel hub that facilitates mounting of a wheel assembly 24 The friction brake 52 may be of any suitable type, such as a disc brake or a drum brake. In addition, the friction brake 52 may be actuated in any suitable manner, such as being hydraulically actuated, electrically actuated, pneumatically actuated, or the like.

A control system 100 controls operation of the drive axle system 20. For example, the control system 100 may include one or more microprocessor-based control modules or controllers 102 that may be electrically connected to or communicate with components of the vehicle 10 and/or the axle assembly 22, such as the electric motor 46, the friction brakes 56, the inverter 80, etc. Control system connections are represented by the double arrowed lines in FIG. 1 as well as by connection symbols A and B. The control system 100 may also monitor and control the electric power source 30. In addition, the control system 100 may also process input signals or data from various input devices or sensors. These input devices may include a speed sensor 110, an accelerator pedal 112, and a brake pedal 114.

The speed sensor 110 provides a signal indicative of the speed of the vehicle. For instance, the speed sensor 110 may provide a signal indicative of the rotational speed or rotational velocity of a rotatable component disposed downstream from the transmission 48, such as the rotational speed of a wheel assembly 24, the axle shaft 44, the drive pinion 50, or the like. In at least one configuration, the speed sensor 110 may be mounted to the axle assembly 22 and may detect rotation of a wheel hub and thus may be indicative of wheel speed.

The accelerator pedal 112 provides a signal that is indicative of a request for acceleration the vehicle 10. The signal provided by the accelerator pedal 112 may be used by the controller 102 to control the electric motor 46. For instance, the controller 102 may control the electric motor 46 to provide propulsion torque based on the signal from the accelerator pedal 112. The accelerator pedal 112 may be operated by a driver or operator of the vehicle 10 to request acceleration and deceleration of the vehicle 10. The accelerator pedal 112 may have any suitable configuration. For example, the accelerator pedal 112 may be a foot-operated pedal that may be mounted near the floor of the passenger compartment of the vehicle 10 or may be a hand-operated pedal that may be provided in another location, such as proximate a steering wheel or control console of the vehicle 10. The accelerator pedal 112 may be moveable between a first position and a second position. The first position may be a released position in which the accelerator pedal 112 is not actuated or depressed by the driver. The first position may correspond with a 0% pedal position when expressed as a percentage. The second position may be a fully actuated or "full throttle" position in which the accelerator pedal 112 is actuated or depressed by the driver to its fullest extent. The second position may correspond with a 100% pedal position when expressed as a percentage. The pedal may also be actuated to multiple intermediate positions between the first position and the second position. These intermediate positions may correspond to pedal positions that are greater than 0% and less than 100% when expressed as a percentage. It is also contemplated that autonomous driving system or cruise control system may provide a signal that is indicative of a request for acceleration of the vehicle 10 and thus function as an accelerator pedal. Accordingly, the term accelerator pedal 112 as used herein also encompasses such systems.

The brake pedal 114 provides a signal that is indicative of a request for deceleration the vehicle 10. The signal provided by the brake pedal 114 may be used by the controller 102 to control the friction brake 52, to request regenerative brake torque be provided by the electric motor 46, or both. For instance, the controller 102 may control a brake actuator that actuates the friction brake 52 to provide a friction brake torque based on the signal from the brake pedal 114. The brake pedal 114 may be operated by a driver of the vehicle 10 to request deceleration of the vehicle 10. The brake pedal 114 may have any suitable configuration. For instance, the brake pedal 114 may be a foot-operated pedal that may be mounted near the floor of the passenger compartment of the vehicle 10 or may be a hand-operated pedal that may be provided in another location, such as proximate a steering wheel or control console of the vehicle 10. The brake pedal 114 may be moveable between a first position and a second position. The first position may be a released position in which the brake pedal 114 is not actuated or depressed by the driver. The first position may correspond with a 0% pedal position when expressed as a percentage. The second position may be a fully actuated position in which the brake pedal 114 is actuated or depressed by the driver to its fullest extent. The second position may correspond with a 100% pedal position when expressed as a percentage. The pedal may also be actuated to multiple intermediate positions between the first position and the second position. These intermediate positions may correspond to pedal positions that are greater than 0% and less than 100% when expressed as a percentage. It is also contemplated that autonomous driving system or cruise control system may provide a signal that is indicative of a request for deceleration of the vehicle 10 and thus function as a brake pedal. Accordingly, the term brake pedal 114 as used herein also encompasses such systems.

It is also contemplated that a single pedal may provide a signal or signals indicative of a request for acceleration or a request for deceleration rather than two pedals. Such a configuration in referred to as a "one-pedal" driving system. Thus, the terms accelerator pedal and brake pedal as used herein also encompasses one-pedal driving system in which a single pedal can be used to request acceleration and deceleration of the vehicle.

Figure 2:
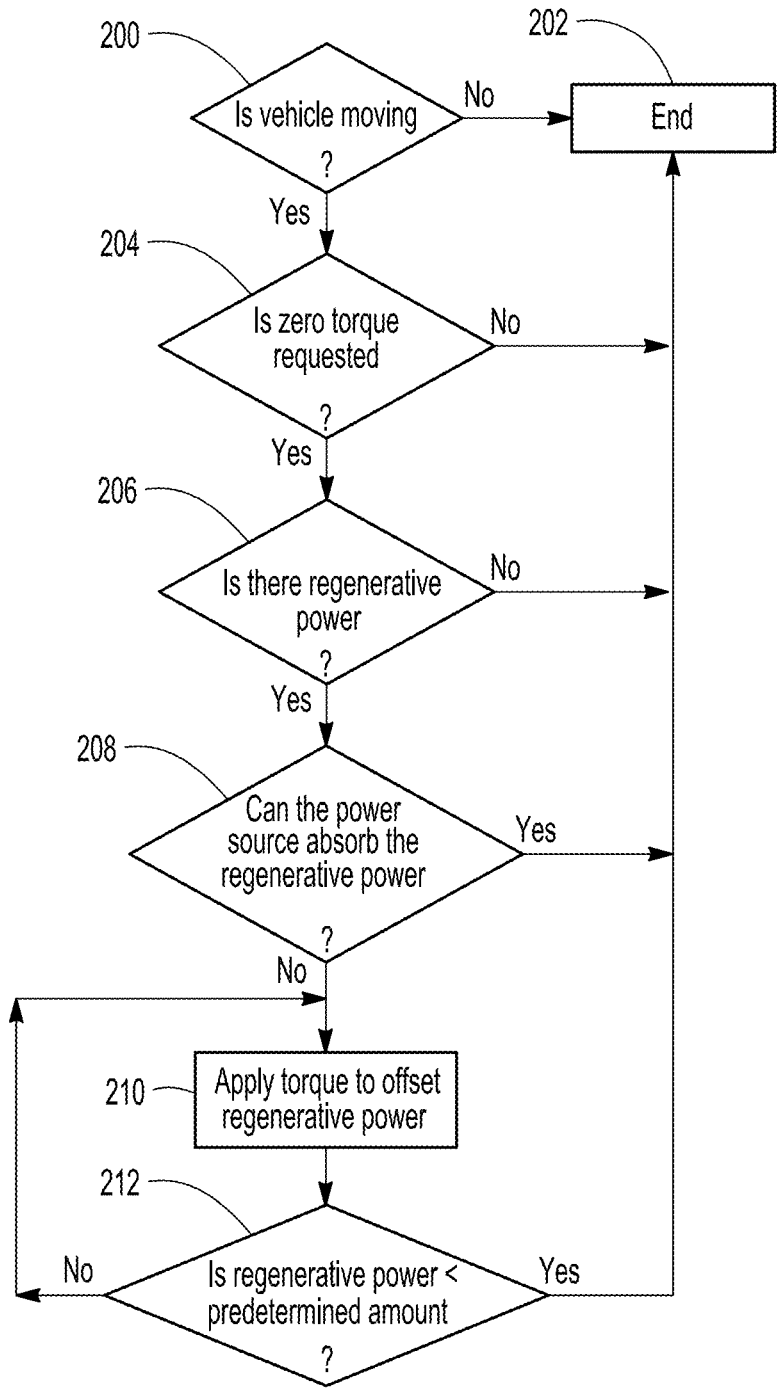
FIG. 2 is a flowchart of a method of control.

Referring to FIG. 2, a flowchart of a method of controlling a vehicle and a drive axle system is shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 100 and may be implemented as a closed loop control system.

As an overview, an electric vehicle or vehicle that has an axle assembly that is powered by an electric motor rather than an internal combustion engine ideally should not provide regenerative brake torque or regenerative power when the vehicle is moving and zero torque is requested (i.e., when propulsion torque and regenerative braking torque are not requested). However, a drive axle system or components thereof, such as the inverter, may have poor torque accuracy, such as error in excess of 1%. As a result, low levels of regenerative power may be generated by the electric motor even though zero torque is requested (i.e., regenerative power is provided when regenerative power is not requested). In some situations, the regenerative power cannot be absorbed or accommodated by the electric power source and cannot be discharged from the vehicle. In such situations the present invention provides a small amount of torque, such as positive torque or propulsion torque to offset or counteract the regenerative power rather than potentially overcharging the electric power source.

For illustration purposes, the method is best understood in the context of a vehicle that is rolling forward and down a hill. The vehicle is permitted to coast down the hill when zero torque is requested, in which case propulsion torque and regenerative brake torque should not be provided. However, a nonzero amount of regenerative power may be generated when there is poor torque accuracy. The method provides energy from the electric power source to the electric motor to attempt to offset and negate the regenerative power when the regenerative power cannot be accommodated by the electric power source.

The method in FIG. 2 is described under the following initial operational conditions. First, the vehicle is in motion (e.g., vehicle speed >0 km/h) rather than being parked or being operated to hold the vehicle in a stationary position. For instance, the vehicle is not being operated to hold the vehicle in position on an inclined surface or to prevent the vehicle from rolling backwards. Second, brake torque is not being provided by a friction brake. In addition, the method will primarily be described in the context of a vehicle that has an accelerator pedal and a brake pedal; however, it is contemplated that a single pedal may be used to provide the functionality of separate pedals and that a cruise control system or autonomous driving system may provide accelerator pedal and brake pedal functionality as previously discussed.

At block 200, the method determines whether the vehicle is moving. The vehicle may be moving when the vehicle speed is greater than zero. It is contemplated that the step may include comparing the vehicle speed to a predetermined speed value. For instance, the vehicle may be moving when the vehicle speed is greater than a predetermined speed value, such as 10 km/h. Determining whether the vehicle is moving may be based on the signal from the speed sensor 110. If the vehicle is not moving, then the method or method iteration ends at block 202. If the vehicle is moving, then the method continues at block 204.

At block 204, the method determines whether zero torque is requested. Zero torque may be requested when acceleration of the vehicle is not requested and braking of the vehicle is not requested. Determining whether acceleration is requested may be based on a signal from the accelerator pedal 112 or a sensor associated with the accelerator pedal 112. For instance, the accelerator pedal 112 may be actuated toward the 100% position as previously discussed. Determining whether braking is requested may be based on the signal from the brake pedal 114 or a sensor associated with the brake pedal 114. For instance, the brake pedal 114 may be actuated from the first position or 0% pedal position to or toward the second position as previously discussed. As an example, the accelerator pedal 112 and the brake pedal 114 may be concurrently released or not actuated when zero torque is requested. If zero torque is not requested (i.e. acceleration is requested, braking is requested, or both), then the method or method iteration ends at block 202. If zero torque is requested, then the method may continue at block 206.

At block 206, the method may determine whether regenerative power is present. Regenerative power may be present when the drive axle system is being operated in a manner in which the electric motor is being driven by the vehicle wheels and is acting as a generator that is generating power. Regenerative power may be identified by the controller based on one or more electrical signals that are indicative of power or current being generated by the electric motor. If regenerative power is not present or is not being generated, then there is no regenerative power to accommodate and the method or method iteration may end at block 202. If regenerative power is present or is being generated, then the method may continue at block 208.

At block 208, the method may determine whether the electric power source can absorb or accommodate the regenerative power. The electric power source can absorb the regenerative power when the electric power source has sufficient storage capacity and the electric power source is operating within normal operating parameters. The capacity or charging limits of the electric power source may vary based on various factors, including but not limited to the state of charge of the electric power source, temperature of the electric power source, fault states or fault conditions of the electric power source, and the like. For instance, the electric power source may be able to capture less energy as the state of charge increases, at elevated temperatures, when some cells of the electric power source are not available to be charged, and the like. If the electric power source can absorb or accommodate the regenerative power, the regenerative power may be provided to the electric power source and the method or method iteration may end at block 202. If the electric power source cannot absorb or accommodate the regenerative power, then the method may continue at block 210.

At block 210, torque may be applied to offset or counteract the regenerative power. For example, the controller may direct electrical energy from the electric power source to the electric motor to attempt to counteract the regenerative power. As such, the method may attempt to provide propulsion torque or positive torque that counteracts the regenerative torque or negative torque that is associated with the regenerative power. The method may attempt to fully offset the regenerative power or partially offset the regenerative power.

Fully offsetting the regenerative power may attempt to counteract the regenerative power by providing an offsetting propulsion torque or positive torque having the same magnitude as the regenerative power. In other words, the electric power source may provide power to the electric motor that has the same magnitude as the regenerative power but that opposes the regenerative torque or regenerative power to attempt to balance and neutralize the regenerative power.

Partially offsetting the regenerative power may attempt to provide positive torque that reduces but does not fully offset the regenerative power. As an example, electrical energy may be provided from the electric power source to the electric motor with a magnitude that is less than the regenerative power, such as an 80% offset of the regenerative power. Presumably only 20% of the regenerative power will remain after offsetting 80% of the regenerative power (1-80% offset=20%). Additional positive torque may be provided iteratively to approach a full offset of the unrequested regenerative power.

At block 212, the method may determine whether the remaining regenerative power after offsetting or counteracting is less than a predetermined amount. The predetermined amount may be zero or a value that is close to zero. The predetermined amount may be a constant or a variable amount. For instance, the predetermined amount may be a variable amount that is based on the current operating parameters or attributes of the electric power source, including but not limited to the current state of charge, temperature of the electric power source, fault states or fault conditions of the electric power source, and the like. For example, predetermined amounts or predetermined values may be stored in a lookup table and may be referenced based on attributes such as the current operating temperature, current state of charge, and the like. If the remaining regenerative power that has not been offset is less than the predetermined amount, then the regenerative power has been sufficiently offset or counteracted and the method or method iteration may end at block 202. If the remaining regenerative power is not less than the predetermined amount, then the method may return to block 210 and attempt to further offset or counteract the remaining regenerative power with electrical energy from the electric power source.

Regenerative power that is fully offset will presumably result in regenerative power that is less than the predetermined amount, such as when the regenerative power does not increase. However, if the regenerative power is not fully offset, this step allows the method to evaluate whether the regenerative power has been sufficiently offset.

Regenerative power that is partially offset may be further reduced by providing additional positive torque to gradually approach fully offsetting the regenerative power. Continuing the example above, electrical energy may be provided from the electric power source to the electric motor to further offset the remaining 20% of the regenerative power. Offsetting the residual 20% of the regenerative power with an 80% offset will reduce the regenerative power from 20% to 4% of the original amount (i.e., reducing 20% by 80% results in 4%). If the predetermined amount is 1% when expressed as a percentage, then another iteration would reduce the regenerative power from 4% to 0.8% (i.e., reducing 4% by 80% result in 0.8%), which would be less than the predetermined amount and allow the method to proceed to block 202.

A system and method as described above may accommodate a drive axle system having poor torque accuracy, such as a system or inverter having poor torque accuracy that produces regeneration torque or regenerative power when zero torque when requested. As a result, the system and method can determine whether regenerative power is being generated and apply a torque offset to reduce regenerative power to acceptable levels. As a result, fault conditions that are indicative of an attempt to overcharge the electric power source may be avoided. Regenerative power may be accommodated by the electric power source when the electric power source has sufficient capacity and capability to do so. Regenerative power may be counteracted by discharging energy from the electric power source when the electric power source does not have sufficient capability or capacity to absorb the regenerative power, which may be transparent to the vehicle operator or unlikely to be perceived by a vehicle operator. The present invention may also accommodate drive axle systems or components such as inverters that have reduced torque accuracy, thereby allowing less expensive hardware such as less expensive inverters to be utilized, thereby reducing system costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a vehicle having a drive axle system, the method comprising:
   providing, when the vehicle is in motion and braking and acceleration of the vehicle are not requested, electrical energy from an electric power source to an electric motor thereby producing torque that offsets regenerative power that is generated by the electric motor when the electric power source is not able to absorb the regenerative power generated by the electric motor.

2. The method of claim 1 wherein electrical energy is not provided from the electric power source to the electric motor to offset regenerative power when the vehicle is not in motion.

3. The method of claim 1 wherein electrical energy is not provided from the electric power source to the electric motor to offset regenerative power when braking of the vehicle is requested.

4. The method of claim 1 wherein electrical energy is not provided from the electric power source to the electric motor to offset regenerative power when acceleration of the vehicle is requested.

5. The method of claim 1 wherein electrical energy is not provided from the electric power source to the electric motor to offset regenerative power when regenerative power is not generated by the electric motor.

6. The method of claim 1 wherein electrical energy is not provided from the electric power source to the electric motor to offset regenerative power when the electric power source is able to absorb the regenerative power generated by the electric motor.

7. The method of claim 1 wherein providing electrical energy with the electric power source to the electric motor provides torque that is propulsion torque that counteracts the regenerative power.

8. The method of claim 1 wherein offsetting regenerative power generated by the electric motor includes fully offsetting the regenerative power.

9. The method of claim 1 wherein offsetting regenerative power generated by the electric motor includes partially offsetting the regenerative power.

10. The method of claim 1 further comprising determining whether the regenerative power is less than a predetermined amount after providing electrical energy with the electric power source to the electric motor to offset regenerative power.

11. The method of claim 10 further comprising terminating providing electrical energy with the electric power source to the electric motor to offset regenerative power when the regenerative power is less than the predetermined amount.

12. The method of claim 10 further comprising continuing to provide electrical energy with the electric power source to the electric motor to offset regenerative power when the regenerative power is not less than the predetermined amount.

13. A vehicle comprising:
   a drive axle system that includes:
      an electric power source;
      an electric motor that is electrically connected to the electric power source; and
      an axle assembly that is operatively connected to the electric motor, wherein the axle assembly has an axle shaft that is connected to a wheel assembly; and
   a controller configured to provide, when the vehicle is in motion and braking and acceleration of the vehicle are not requested, electrical energy from the electric power source to the electric motor thereby producing torque that offsets regenerative power that is generated by the electric motor when the electric power source is not able to absorb the regenerative power generated by the electric motor.

14. The vehicle of claim 13 further comprising a speed sensor that provides a signal indicative of motion of the vehicle.

15. The vehicle of claim 14 wherein the signal provided by the speed sensor is indicative of rotation of the wheel assembly.

16. The vehicle of claim 13 further comprising an accelerator pedal that provides a signal indicative of a request for acceleration of the vehicle.

17. The vehicle of claim 13 further comprising a brake pedal that provides a signal indicative of a request for deceleration of the vehicle.

18. The vehicle of claim 13 wherein the controller does not provide electrical energy from the electric power source to the electric motor to offset regenerative power generated by the electric motor when there is no regenerative power generated by the electric motor.

19. The vehicle of claim 13 wherein the controller does not provide electrical energy from the electric power source to the electric motor to offset regenerative power generated by the electric motor when the electric power source is able to absorb the regenerative power.

20. The vehicle of claim 13 wherein the controller does not provide electrical energy from the electric power source to the electric motor to offset regenerative power when the vehicle is not in motion.

* * * * *